Feb. 21, 1950

J. O. HIRSCHFELDER 2,497,888

MEANS FOR PREVENTING EXCESSIVE COMBUSTION
PRESSURE IN ROCKET MOTORS

Filed Oct. 11, 1944

Inventor
JOSEPH O. HIRSCHFELDER,

By C. E. Herrstrom & A. E. Thibodeau
Attorneys

Patented Feb. 21, 1950

2,497,888

UNITED STATES PATENT OFFICE 2,497,888

MEANS FOR PREVENTING EXCESSIVE COMBUSTION PRESSURE IN ROCKET MOTORS

Joseph O. Hirschfelder, Madison, Wis., assignor to the United States of America as represented by the Secretary of War Application October 11, 1944, Serial No. 558,232

1 Claim. (Cl. 60—35.6)

(Granted under the act of March 3, 1883, as amended April 30, 1928; 370 O. G. 757)

The invention described herein may be manufactured and used by or for the Government for govermental purposes without the payment to me of any royalty thereon.

This invention relates to a rocket type motor and particularly to a rocket motor for jet propelled projectiles.

A rocket motor conventionally comprises a combustion chamber wherein a propellent charge is mounted. The propellent charge is combustible to produce a large volume of gases and such gases are discharged through a restricted orifice at the rear of combustion chamber, thereby producing a forward impelling force on the rocket motor structure.

In the design of a rocket motor, the walls of the combustion chamber are made just thick enough, allowing a reasonable factor of safety, to withstand the internal pressure at which the rocket motor is to operate. For a given motor chamber the burning rate of the propellent varies with the temperature of the propellent. If the temperature increases, the burning rate increases. This increase in burning rate, or increase in rate of gas evolution causes an increase in the gas pressure within the combustion chamber which further increases the burning rate with the result that progressively increasing pressures are developed which frequently burst the rocket combustion chamber before the projectile has cleared the projector. The progressive increase in burning speed, caused by an increase in the temperature of the propellent, is such that, in a fraction of a second, the propellent, instead of burning evenly, burns with explosive force and the development of excessive pressures. Obviously this is a characteristic of rockets which must be corrected before they can be safely adapted to service application wherein they may be subjected to varying temperatures.

If the ambient temperature of the rocket is reduced, resulting in a lower powder temperature, the burning rate will also be reduced, and the total burning time will be increased with the result that in those applications wherein the rocket is fired from shoulder gun projectors, the firing personnel is subjected to the possibility of injury from the flame and hot gases ejected from the jet.

It becomes an object of this invention, therefore, to provide a rocket motor safely operable over an extended range of ambient temperatures.

A particular object of this invention is to provide a rocket motor in which the total cross sectional area of the discharge passage for the combustion gases may be readily varied to compensate for atmospheric temperature conditions.

The specific nature of this invention as well as other objects and advantages thereof will clearly appear from a description of a preferred embodiment as shown in the accompanying drawing in which.

Figure 1:
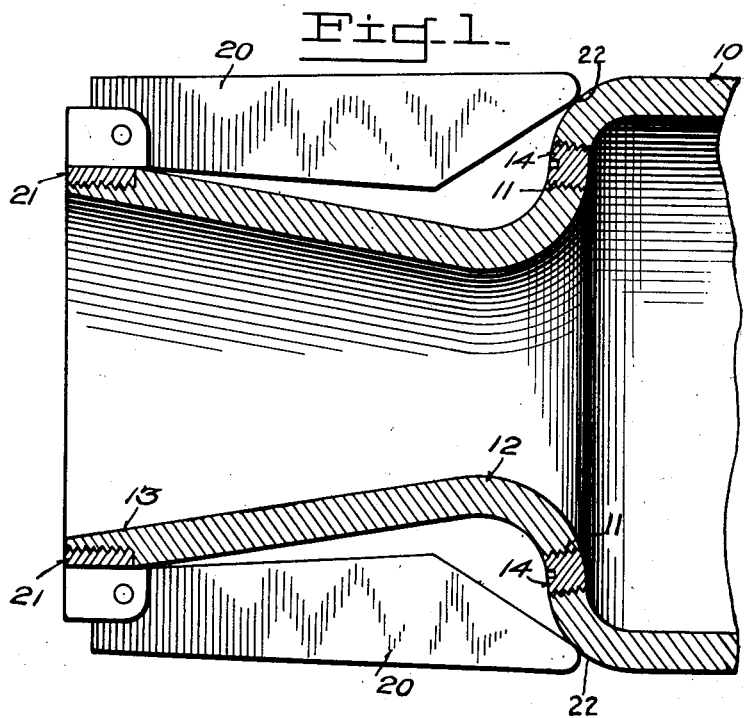
Fig. 1 is a longitudinal sectional view of the rear portion of a rocket combustion chamber shaped to form a nozzle embodying this invention.
Figure 2:
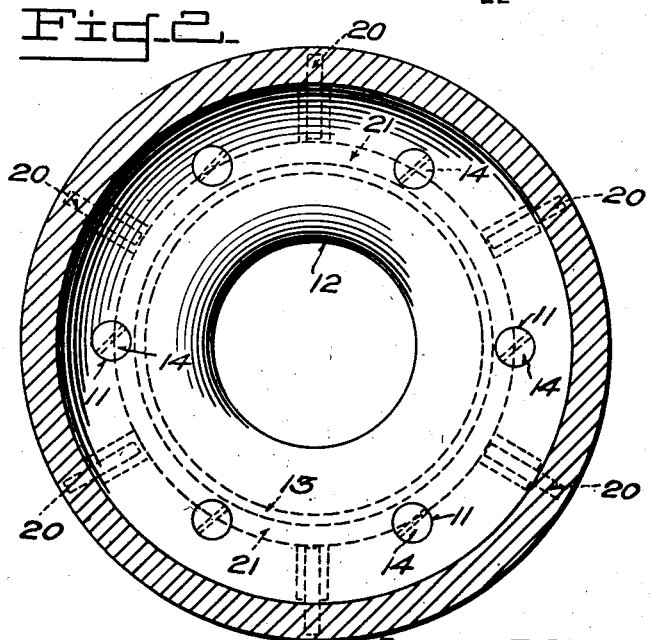
Fig. 2 is a front elevational view of the nozzle of Fig. 1.

In Figure 1 there is shown the rear portion of a combustion chamber 10 of a rocket motor. Chamber 10 has its walls turned radially inwardly as at 22 to form a constricted throat 12. The walls are then flared rearwardly and outwardly to form a skirt portion, the whole forming a Venturi-like passage of conventional form.

While portion 10 has been described as being the rear portion of the rocket combustion chamber and therefore integral with such chamber, it will be understood that this portion may be formed separately and subsequently secured to the rear end of any suitable combustible chamber (not shown) containing a propellent combustible to generate propellent gases. A plurality of fins 20 may be pivotally secured in spaced relationship about the periphery of a mounting ring 21 and mounting ring 21 is threadably secured to the rear portion of nozzle member 10.

At the point where the walls of chamber 10 are converged to form the throat 12, a plurality of tapped holes 11 are provided in the nozzle member spaced about the periphery thereof. The axes of tapped holes 11 are preferably inclined slightly rearwardly and outwardly with respect to the axis of the nozzle member 10 and hence any gases discharged through the tapped holes 11 do not substantially reduce the total thrust produced by the propellent gases. In the specific example shown, six tapped holes 11 are provided, equally spaced about the periphery of chamber 10 and, of course, equally inclined to the central longitudinal axis of the chamber. These holes preferably have their axes intersecting at a point on said axis substantially coincident with the center of gravity of the rocket projectile.

To compensate for atmospheric temperature conditions under which the rocket projectile may be operated, a plurality of threaded plugs 14 are provided which may be screwed into a selected number of holes 11 thereby varying the total discharge area afforded by such holes.

In the application of this invention, the rocket motor is preferably designed so as to function efficiently at the lower ranges of atmospheric temperatures with plugs 14 inserted in all of the tapped holes 11. Then for higher atmospheric temperatures, compensation of the correspondingly higher pressures developed in the rocket motor is obtained by removing a selected number of threaded plugs 14. Two opposed plugs are preferably removed at one time so that the direction of the resulting thrust produced on the rocket is not shifted.

The effectiveness of the structure embodying this invention may be illustrated by reference to a specific example of a nozzle member wherein the throat diameter is 1.83 inches and six tapped holes of $\frac{7}{16}$ inch diameter are utilized. Thus a 16 percent increase in discharge area for the combustion gases may be provided by removing all of the threaded plugs 14. With a propellent powder commonly utilized in rocket projectiles, such increase in discharge area will prevent an increase in maximum pressure developed within the combustion chamber over an increase in atmospheric temperature of 80° F. Such range of temperature compensation produced by this invention is obviously completely satisfactory for the usual atmospheric conditions under which rocket projectiles are operated.

I claim:

In a rocket component, a tubular casing forming a motor chamber, said casing having its rear wall portion turned radially inwardly then flared rearwardly and outwardly to form a smooth Venturi-like nozzle for the discharge of combustion gases generated in said chamber, there being a series of discharge ports through said radial wall portion whereby a portion of the gases generated in said chamber may pass directly to the ambient air, said holes being even in number and equally angularly spaced about the central longitudinal axis of said motor chamber, each said hole being slightly inclined rearwardly and outwardly, and individually operable means adapted to selectively close each said hole.

JOSEPH O. HIRSCHFELDER.

REFERENCES CITED

The following references are of record in the file of this patent:

UNITED STATES PATENTS

| Number | Name | Date |
| --- | --- | --- |
| 2,412,266 | Hoagland | Dec. 10, 1946 |
| 2,421,522 | Pope | June 3, 1947 |